United States Patent [19]

Collin

[11] Patent Number: 5,422,140
[45] Date of Patent: Jun. 6, 1995

[54] METHOD OF COATING A CERAMIC BODY

[75] Inventor: Marianne Collin, Enskede, Sweden

[73] Assignee: Sandvik AB, Sandviken, Sweden

[21] Appl. No.: 243,765

[22] Filed: May 17, 1994

Related U.S. Application Data

[63] Continuation of Ser. No. 66,652, May 25, 1993, abandoned.

[30] Foreign Application Priority Data

Jul. 17, 1992 [SE] Sweden .................. 9202195

[51] Int. Cl.⁶ .............................. B05D 3/12
[52] U.S. Cl. ................. 427/275; 427/248.1; 427/249; 427/255; 427/277; 427/287; 427/290; 427/292; 427/370; 427/585
[58] Field of Search ............ 427/370, 277, 248.1, 427/585, 290, 292, 287, 275, 249, 255

[56] References Cited

U.S. PATENT DOCUMENTS

| | | | |
|---|---|---|---|
| 4,332,458 | 3/1982 | Siebmanns | 427/331 |
| 4,539,231 | 9/1985 | Betz et al. | 427/255 |
| 4,619,866 | 10/1986 | Smith et al. | 428/336 |
| 4,801,510 | 1/1989 | Mehrotra et al. | 428/336 |
| 4,820,663 | 4/1989 | Mehrotra et al. | 427/248.1 |
| 4,997,683 | 3/1991 | Wright | 427/370 |

FOREIGN PATENT DOCUMENTS 413096 2/1991 European Pat. Off.

*Primary Examiner*—Janyce Bell
*Attorney, Agent, or Firm*—Burns, Doane, Swecker & Mathis

[57] ABSTRACT

There is now provided a method of manufacturing a coated ceramic body with improved performance when used as a tool insert for metal cutting purposes. By subjecting the body after the coating to a hot isostatic pressing operation at a pressure of 10-300 MPa and a temperature of >1200° C., an improved adherence of the coating has been achieved. The method is particularly applicable to whisker-reinforced ceramic composites.

12 Claims, No Drawings

METHOD OF COATING A CERAMIC BODY

This application is a continuation of application Ser. No. 08/066,652, filed May 25, 1993, now abandoned.

BACKGROUND OF THE INVENTION

The present invention relates to a method of improving the adhesion of wear resistant surface coatings on whisker-reinforced ceramics resulting in improved performance of the coated product.

Cutting tool inserts made from SiC-whisker-reinforced alumina are an established product on the cutting tool market and are mainly used in cutting heat resistant materials and, to some extent, for use in cutting cast iron. However, when used for cutting steel and other iron-rich alloys SiC-whisker-reinforced alumina exhibits poor tool life time. It is believed that these poor tool lives are due to a strong chemical reaction which occurs between the iron in the steel and the silicon carbide whiskers in the cutting insert at the high temperatures produced at the cutting edge during machining. From, e.g., U.S. Pat. No. 4,801,510, it is known that this kind of attack is reduced by an application of a wear resistant surface coating. This improves the whisker-reinforced ceramic cutting tool insert's performance in the cutting of steel and other iron-rich alloys. However, it is difficult to provide sufficient adherence of the surface coating and, for that reason, the area of application of coated SiC-whisker-reinforced alumina cutting inserts has been restricted.

Hot isostatic pressing (HIP-treatment) using various encapsulating methods to facilitate the isostatic pressing operation is well-known. For example, U.S. Pat. No. 4,820,663 discloses a method of manufacturing a shaped, whisker-reinforced ceramic body of near theoretical density comprising forming a compact, encapsulating the compact by applying a coating by vapor deposition, heating and isostatically pressing the encapsulated compact in an atmosphere that reacts with the coating and/or compact substrate to increase the density of the resulting body. To make a cutting tool from that body, the coating is ground away and the body is shaped into a cutting tool insert having a cutting edge forward at the junction of a rake face and a flank face.

OBJECTS AND SUMMARY OF THE INVENTION

It is an object of this invention to avoid or alleviate the problems of the prior art.

It is further an object of this invention to provide a method of improving the adhesion of wear resistant surface coatings on whisker reinforced ceramics.

In one aspect of the invention them is provided a method of manufacturing a coated ceramic body comprising forming and sintering a body of a ceramic, coating said ceramic body with a wear-resistant surface coating and subjecting said coated body to a hot isostatic pressing operation at a pressure of 10-300 MPa and a temperature of >1200° C.

DETAILED DESCRIPTION OF THE PREFERRED EMBODIMENTS OF THE INVENTION

It has now been found that the adherence of a surface coating on a ceramic body can be improved by a HIP-treatment (hot isostatic pressing). This procedure to improve the adherence by a subsequent HIP-treatment can essentially be used for all kinds of coatings provided that no adverse reactions between the coating and the ceramic substrate take place during the HIP-treatment.

The ceramic body is manufactured by conventional technique, e.g., wet dispersion, drying, granulation, uniaxial hot pressing or tool pressing/hot isostatic pressing to full density and finally grinding to prescribed dimensions compensating for the later applied surface coating. The coating is applied by conventional technique, such as CVD, PVD, etc., and comprises one or more layers of wear resistant materials as known in the art such as carbides, nitrides and/or oxides, preferably alumina, with a thickness of <20 $\mu$m. The coating is applied on the surfaces defining the cutting edge as known in the art. The coated body is then HIP-treated in a gas atmosphere, preferably argon or nitrogen, and at a pressure of 10-300 MPa, preferably 50-200 MPA, and at a temperature of 1200° C. or higher, preferably 1500° to 1900° C., for 1-200 minutes.

In some cases it has been found that only heat treatment at atmospheric pressure is sufficient to get improved adherence, but the best adherence and performance are obtained with HIP-treatment of coated ceramic inserts.

The method according to the invention is particularly applicable to ceramic materials comprising, in addition to conventional sintering aids and/or grain growth inhibitors, 5-50% by volume, preferably 15-35 % by volume, of single crystal whiskers and/or fibers and/or platelets and/or submicron particles of carbides, nitrides and/or borides of Si, Ti, Zr, Hf, Ta, and/or Nb or solid solutions thereof. The whisker/fiber material comprises hair-shaped monocrystals/polycrystals with a diameter of 0.2-10 $\mu$m and a length of 2.5-100 $\mu$m and a length/diameter ratio of preferably 5-10. The platelets are monocrystal plates with a diameter of 0.5-40 $\mu$m and a diameter/thickness ratio of 5-50, preferably 10-20. The submicron particles generally have a size <500 nm.

The grain size of the ceramic matrix should be <10 $\mu$m, preferably <4 $\mu$m. The matrix is based on ceramic oxides, preferably $Al_2O_3$, or ceramic nitrides, preferably $Si_3N_4$, possibly further containing hard carbides and/or nitrides and/or borides and/or binder metal. The ceramic matrix shall preferably contain <20 volume-% $ZrO_2$. The relative density shall be at least 95%, preferably 98%, most preferably 99%.

It is believed that the improved adherence of the surface coating after HIP-treatment is due to the fact that the same type of movement of atoms that occurs in ordinary hot isostatic pressure sintering takes place in the interface region between the surface coating and the ceramic body.

The invention is additionally illustrated in connection with the following Examples which are to be considered as illustrative of the present invention. It should be understood, however, that the invention is not limited to the specific details of the Examples.

EXAMPLE 1

Ceramic inserts with the composition 75 weight-% alumina with sintering aid and 25 weight-% SiC-whiskers are manufactured and ground to the style SNGN 120708 T02520. The ground inserts are then coated with a 6 $\mu$m thick alumina coating with CVD technique according to U.S. Pat. No. 4,619,866. The coated inserts are then treated in four different ways:

Inserts A are HIP-treated in an argon atmosphere at 150 MPa and 1700° C. for 10 minutes.

Inserts B are HIP-treated in an argon atmosphere at 150 MPa and 1850° C. for 10 minutes.

Inserts C are heat treated in an argon atmosphere at atmospheric pressure and 1700° C for 30 minutes.

Inserts D are not treated at all.

The inserts are compared in a turning test developed to test flaking of surface coatings with the following results:

Inserts A and B show flaking of less than 10% of the area of engagement. Inserts C show flaking of about 25% of the area of engagement. Inserts D show flaking of more than 50% of the area of engagement. Thus, the CVD-coated and HIP-treated inserts show significantly less flaking than the only CVD-coated inserts. This indicates that these inserts have an improved coating adherence due to the HIP-treatment.

EXAMPLE 2

Two ceramic inserts with the composition 75 weight-% alumina with sintering aid and 25 weight-% SiC-whiskers are manufactured and ground to the style SNGN 120708 T02520. The ground inserts are then coated with a 6 μm thick alumina coating with CVD-technique according to U.S. Pat. No. 4,619,866. One of the inserts is then HIP-treated in an argon atmosphere at the pressure 140 MPa and the temperature of 1750° C. The inserts are then compared of a turning operation in a steel (SS2511) at 450 m/min and a depth of cut of 1.5 mm using cutting fluid. After 10 minutes turning the inserts are inspected with respect to adherence of the coating in the contact region of the clearance face. The alumina coated and not HIP-treated insert shows an apparent flaking whereas the alumina coated and HIP-treated insert shows more than 50% decreased flaking compared to the former. This shows that the latter insert has an improved coating adherence due to the HIP-treatment.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of manufacturing a coated ceramic body comprising forming and sintering a body of a ceramic to essentially final dimensions and full density, optionally grinding said sintered body to final dimensions compensating for the coating to be applied, coating said ceramic body with a wear resistant surface coating and subjecting said coated body to a hot isostatic pressing operation at a pressure of 10–300 MPa and a temperature of > 1200° C.

2. The method of claim 1 wherein said body comprises a ceramic matrix having distributed therethrough 5–50% by volume reinforcing whiskers and/or platelets.

3. The method of claim 2 wherein said body further comprises submicron particles of carbides, nitrides and/or borides of Si, Ti, Zr, Hf, Ta and/or Nb or solid solutions thereof.

4. The method of claim 1 wherein the thickness of the coating is <20 μm.

5. The method of claim 1 wherein said ceramic matrix comprises a ceramic oxide or nitride.

6. The method of claim 4 wherein said ceramic matrix further contains hard carbides, hard nitrides, hard borides, binder metal or mixtures thereof.

7. The method of claim 1 wherein said matrix in addition contains <20% by volume $ZrO_2$.

8. The method of claim 1 wherein said coating comprises wear resistant oxides, carbides and/or nitrides.

9. The method of claim 2 wherein said ceramic matrix comprises $Al_2O_3$, said whisker comprises SiC and the coating comprises alumina.

10. The method of claim 1 wherein the hot isostatic, pressing is conducted at a pressure of 50–200 MPa and a temperature of 1500 to 1900° C.

11. The method of claim 1 wherein the body is formed into a cutting insert having a cutting edge during the forming step and the coating is applied to surfaces defining the cutting edge during the coating step.

12. The method of claim 1 wherein the forming step is carried out by hot pressing the body of ceramic followed by grinding the pressed body to the final dimensions.

* * * * *